United States Patent
Braun et al.

(10) Patent No.: US 6,283,772 B1
(45) Date of Patent: Sep. 4, 2001

(54) FASTENING DEVICE FOR SECURING A SUBASSEMBLY TO A BODY OF A FUEL DELIVERY SYSTEM

(75) Inventors: Hans-Peter Braun, Renfrizhausen; Stefan Woerz, Schwieberdingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/242,044

(22) PCT Filed: Feb. 25, 1998

(86) PCT No.: PCT/DE98/00556
§ 371 Date: Feb. 8, 1999
§ 102(e) Date: Feb. 8, 1999

(87) PCT Pub. No.: WO98/57061
PCT Pub. Date: Dec. 17, 1998

(30) Foreign Application Priority Data

Jun. 7, 1997 (DE) .............................................. 197 24 165

(51) Int. Cl.⁷ .................................................. H01R 13/648
(52) U.S. Cl. ............................................ 439/100; 123/470
(58) Field of Search ....................... 439/92, 100; 174/51, 174/78; 123/470, 456, 469, 463

(56) References Cited

U.S. PATENT DOCUMENTS 3,999,825 * 12/1976 Cannon ................................ 439/192
4,107,452 * 8/1978 Razvi .................................. 174/84.5
4,367,718 * 1/1983 Heine ................................... 123/557
5,070,844 * 12/1991 Daly .................................... 123/470
5,092,300 * 3/1992 Imoehl et al. ........................ 123/469
5,104,159 * 4/1992 Sugiyama et al. ................... 285/373
5,146,896 * 9/1992 Imoehl et al. ........................ 123/470
5,281,761 * 1/1994 Woo et al. ............................ 439/100
5,664,809 * 9/1997 Bates ..................................... 174/51

FOREIGN PATENT DOCUMENTS

4007436 * 9/1991 (DE) .

* cited by examiner

Primary Examiner—Neil Abrams
(74) Attorney, Agent, or Firm—Ronald E. Greigg; Edwin E. Greigg

(57) ABSTRACT

A fastening element (50) secures a subassembly (20) to a body (2). With the fastening device set forth, an elastic prestressing of at least one flex region lateral to the securing direction assures a reliable electrical connection between the subassembly (20) and the fastening element (50). As a result, it is possible to simply and easily connect the subassembly (20) to a definite electrical potential by means of the fastening element (50). The fastening device is particularly provided for a fuel delivery system of an internal combustion engine of a motor vehicle.

13 Claims, 7 Drawing Sheets

FASTENING DEVICE FOR SECURING A SUBASSEMBLY TO A BODY OF A FUEL DELIVERY SYSTEM

PRIOR ART

The invention is based on a fastening device for securing a subassembly to a body of a fuel delivery system.

A fuel delivery system of an internal combustion engine, preferably in a motor vehicle, usually includes a number of subassemblies. In the fuel delivery system, a fuel pump feeds fuel from a fuel tank by way of various subassemblies until the fuel finally reaches a combustion chamber of the engine. One of the subassemblies, for example, is a pressure regulator, a pressure reducer, a fuel accumulator, a pressure damper, a fuel filter, or the like.

It can be the case that one of the subassemblies, for example the pressure regulator or the pressure reducer, is itself electrically conductive or a component of this subassembly is electrically conductive, wherein the electrically conductive component or the subassembly, however, is disposed in an electrically insulated manner, for example by virtue of the fact that the subassembly is disposed on a base body comprised of nonconductive plastic.

In the subassembly with an electrically conductive component, an electrostatic charging of the electrically conductive component can occur by means of an electrical charge separation. Since the electrostatic charging of the electrically conductive component usually does not cause any trouble, and in particular does not cause any functional interruption, the electrostatic charging of the electrically conductive component is normally not noticed or at least is not perceived. Because there are subassemblies through which the fuel flows, through a narrow gap, for example with a high flow velocity, e.g. in a pressure regulator or pressure reducer, the electrostatic charging of the electrically conductive component can be very intense.

Sometimes in a fuel delivery system, luckily very rarely, it has been possible for a fire or an explosion to occur with a cause that could not be explained. The inventor of the present patent application is of the view that at least part of these unexplainable fires were caused by electrostatic charging of an electrically insulated component of a subassembly of the fuel delivery system.

In order to be able to assemble the fuel delivery system inexpensively, it is important that the labor cost for attaching the subassembly to a body of the fuel delivery system is low and it is important that the subassembly is reliably secured to the body.

German patent application DE 40 07 436 C2 discloses a fastening device for a pressure regulator which is connected to a fuel delivery system above a cup-shaped receptacle and is fixed by means of a fastening element that engages in a collar of the receptacle, wherein the fastening element is embodied as a ring that is elastic in the radially outward direction, which engages in the receptacle with a positive fit. With this fastening device, a reliable electrical contact between the fastening element and the pressure regulator is not assured. Furthermore, with this fastening device, a special tool is required to install the fastening element into the receptacle.

Since it is not assured that the pressure regulator and the fastening element are pressed together under all circumstances, a continual, reliable electrical contact between the pressure regulator and the fastening element is not assured.

ADVANTAGES OF THE INVENTION

The fastening device according to the invention, has the advantage over the prior art that a reliable electrical contact between the subassembly and the fastening element is assured under all circumstances.

The reliable electrical contact between the subassembly and the fastening element offers a simple, advantageous possibility of preventing an electrostatic charging of the subassembly by way of the fastening element and thus eliminates a source of danger.

Because of the possibility for the electrical contacting of the subassembly by way of the fastening element, a changing of the subassembly is advantageously not required in order to be able to connect the subassembly 20 to a definite electrical potential.

Since it is simple to provide the fastening element with a favorable elasticity lateral to the securing direction, the assurance of a favorable electrical contact between the subassembly and the fastening element can advantageously be easily achieved even with high measurement tolerances.

Advantageous improvements and updates of the fastening device are possible by means of the measures taken hereinafter.

The connection on the fastening element offers the advantage that an electrical conductor can be simply connected to the fastening element.

If the connection is embodied in the form of a flat plug contact, then this has the advantage that the electrical conductor can be simply plugged together with the fastening element.

If the fastening element is embodied, at least in the elastic region, as thinner lateral to the securing direction than it is in the securing direction, then this produces the advantage that the subassembly is secured against the body in a relatively rigid manner in the securing direction, but lateral to the securing direction, the fastening element is elastically flexible in a relatively favorable manner and is consequently favorably resilient.

If a securing element is provided on the body and this element is elastic lateral to the securing direction and engages behind the fastening element in the assembled state, then the advantage is obtained that the fastening element can be very simply mounted on the body.

The locking element achieves the advantage that after the fastening element is mounted on the body, a continual and reliable securing of the fastening element to the body is assured without this requiring a high material cost, in particular, the securing element on the body can be embodied in a relatively material-saving manner.

BRIEF DESCRIPTION OF THE DRAWINGS

Preferably selected, particularly advantageous exemplary embodiments of the invention are shown in simplified fashion in the drawings and will be explained in more detail in the description below.

FIG. 1 is a cross sectional view of a body in a fuel delivery system made of an electrically non-conductive material;

FIG. 2 is an exploded view of some components of FIG. 1;

FIG. 3 is an oblique perspective view of the body of FIG. 1;

FIG. 4 illustrates a fastening element shown in FIG. 1;

FIG. 5 is an oblique perspective view of a modification of the body shown in FIG. 3;

FIG. 6 is a top view of a fastening element; and

FIG. 7 is an oblique perspective view of another modification of the body shown in FIGS. 3 and 5.

DESCRIPTION OF THE EXEMPLARY EMBODIMENTS

The fastening device embodied according to the invention is used to secure a subassembly to a body of a fuel delivery system. In the fuel delivery system, fuel is supplied to an internal combustion engine. The internal combustion engine can, for example, be an Otto engine. The fuel, for example, is an easily ignitable gasoline.

A fuel delivery system is normally comprised of a large number of components or of various bodies on which a subassembly or usually a number of subassemblies are mounted. For example, the fuel delivery system includes a cover made of electrically non-conductive plastic for covering a fuel reservoir, wherein a subassembly is mounted in the cover or in this body and the subassembly can, for example, be a pressure regulator or a pressure reducer. Also a fuel distributor tube of the fuel delivery system constitutes a body to which a subassembly is mounted, for example a pressure regulator, a pressure reducer, an accumulator, a pressure damper, a filter, or a similar subassembly. In order to thus simplify the assembly of the fuel delivery system, it is important that the subassembly can be simply, easily, and securely connected to the body.

Figure 1:
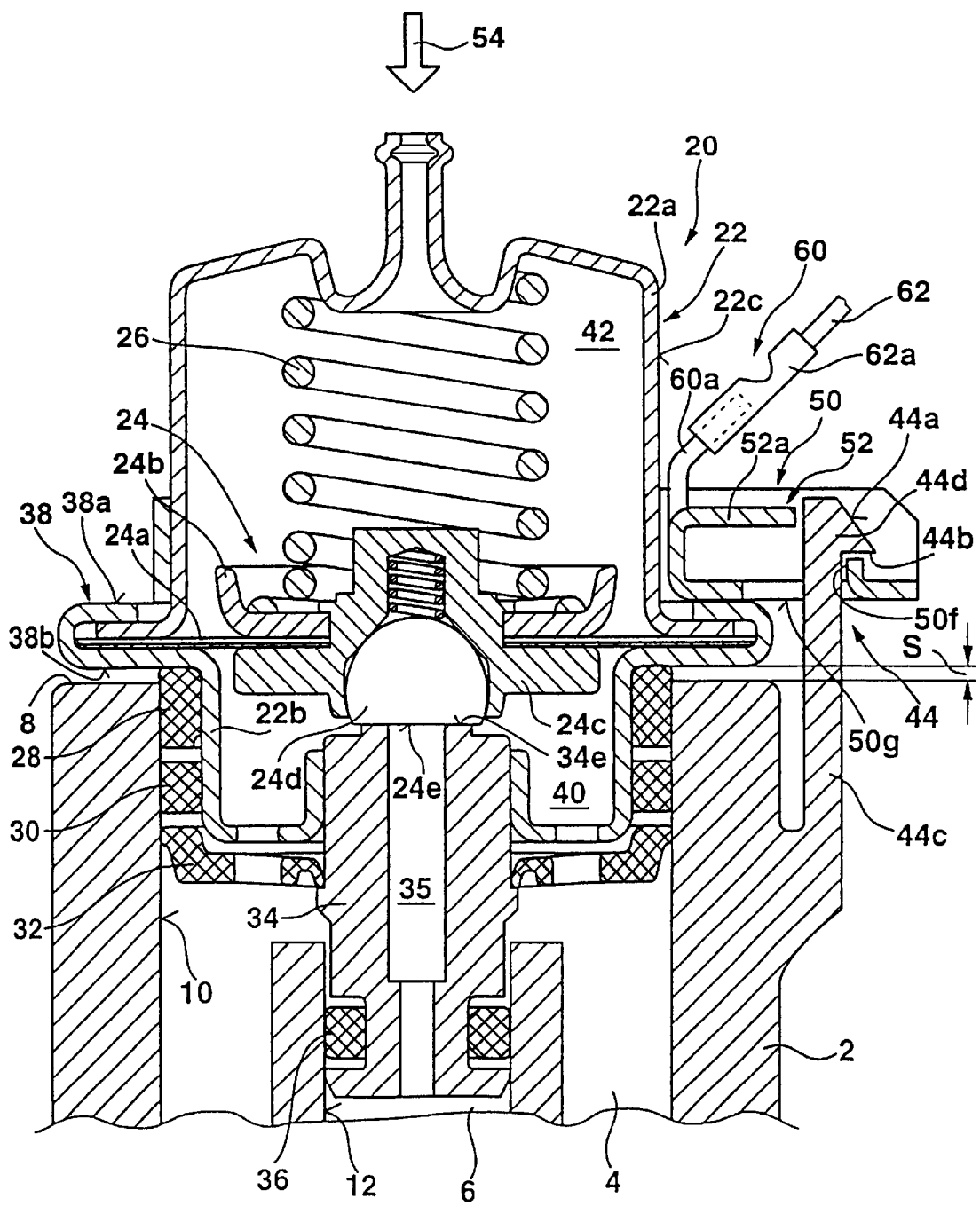
FIGS. 1 to 7 show different details and views of variously embodied exemplary embodiments.

FIG. 1 shows a first preferably selected, particularly advantageous exemplary embodiment.

FIG. 1 shows a body 2 that belongs to a fuel delivery system. The body 2 is comprised, for example, of an electrically non-conductive material, preferably plastic, or the body is disposed in its surroundings so that it has no electrically conductive contact with a definite electrical potential.

Various conduits lead through the body 2. One of the conduits is used as a fuel inlet 4. Fuel fed by a fuel pump can flow in by way of the fuel inlet 4. For the sake of improved visibility, the fuel pump is not shown. The fuel travels, for example, to fuel injection valves, not shown, by way of a line, not shown, that branches from the fuel inlet 4. By way of another conduit that serves as a fuel return, fuel can flow back into a fuel tank, for example, which is not shown for the sake of better visibility.

This conduit will be called the fuel continuation 6 below.

There are also instances in which the fuel travels by way of the fuel continuation 6, for example to a fuel distributor pipe, which is not shown for the sake of better visibility, or to an injection valve, not shown.

On the body 2, there is an outwardly pointing shoulder 8 on the end face. The shoulder 8 can protrude outward or, in contrast to the exemplary embodiment depicted, can be provided recessed in the body 2. Leading from the shoulder 8 on the end face, a cylindrical neck 10 leads into the body 2. Coaxial to the neck 10, a smaller, cylindrical bore 12 leads into the body 2. The neck 10 communicates with the fuel inlet 4 and the bore 12 communicates with the fuel continuation 6.

A subassembly 20 is partially inserted into the neck 10. In the preferably selected exemplary embodiment, the subassembly 20 is embodied in the form of a pressure regulator. It should be noted that the subassembly 20 can, for example, also be a pressure reduction valve, an accumulator, a pressure damper, a filter, an injection valve, or the like.

The subassembly 20 shown by way of example includes a housing 22, a membrane unit 24, a valve spring 26, a guide ring 28, a seal 30, a disk 32, a nozzle 34, and a seal 36. In the exemplary embodiment depicted, the housing 22 is comprised of a first housing part 22a and a second housing part 22b. The membrane unit 24 includes a membrane 24a, a first disk 24b, a second disk 24c, and a closing body 24d.

The two housing parts 22a, 22b are connected to each other by way of a flanged connection. Because of the flanged connection, there is a circumferential, radially protruding bulge 38 on the housing 22. The bulge 38 has a radially extending end face 38b remote from the shoulder 8 and a radially extending end face 38a remote from the body 2. The housing part 22a of the housing 22 has a continuous cylindrical or slightly conical circumference 22c.

The membrane 24a has a central hole by way of which the membrane 24a is installed in a leakproof and reliable manner between the two disks 24b, 24c. The outer circumference of the membrane 24a of the membrane unit 24 is clamped in a leakproof and reliable manner between the two disks 24b, 24c in the region of the flanged connection that forms the bulge 38. The membrane unit 24 divides a pressure chamber 40 from a valve chamber 42 inside the housing 22.

The nozzle 34 has an inner end face oriented toward the closing body 24d of the membrane unit 24. The inner end face of the nozzle 34 is used as a valve seat or as a valve face 34e. Starting from the valve face 34e, an opening 35 leads coaxially through the nozzle 34 to the fuel continuation 6. Depending on the pressure prevailing in the pressure chamber 40 and depending on the pressure prevailing in the valve chamber 42, as well as depending on the force of the valve spring 26 and depending on the pressure in the opening 35 leading through the nozzle 34, the closing body 24d lifts up from the valve face 34e, or a valve face 24e provided on the closing body 24d rests against the valve face 34e of the nozzle 34 so that the opening 35 is cut off from the pressure chamber 40 and no fuel can flow from the fuel inlet 4 through the subassembly 20, and into the fuel continuation 6. If the pressure in the pressure chamber 40 exceeds a particular value, then the valve face 24e of the movable membrane unit 24 lifts up from the valve face 34e that is fixed in the housing, and the fuel can flow from the fuel inlet 4, through the narrow gap between the valve faces 24e, 34e, and into the fuel continuation 6.

The guide ring 28 and the disk 32 provide for an easy potential installation of the subassembly 20 into the neck 10. The seal 30 ensures that no fuel can penetrate outward from the inside of the body 2 and the seal 36 separates the fuel continuation 6 from the fuel inlet 4.

A securing element 44 is formed onto the body 2. A fastening element 50 is inserted into the securing element 44. The fastening element 50 that is held by the securing element 44 holds the subassembly 20 on the body 2, in the exemplary embodiment depicted, so that the subassembly 20 cannot fall out of the neck 10.

Figure 2:
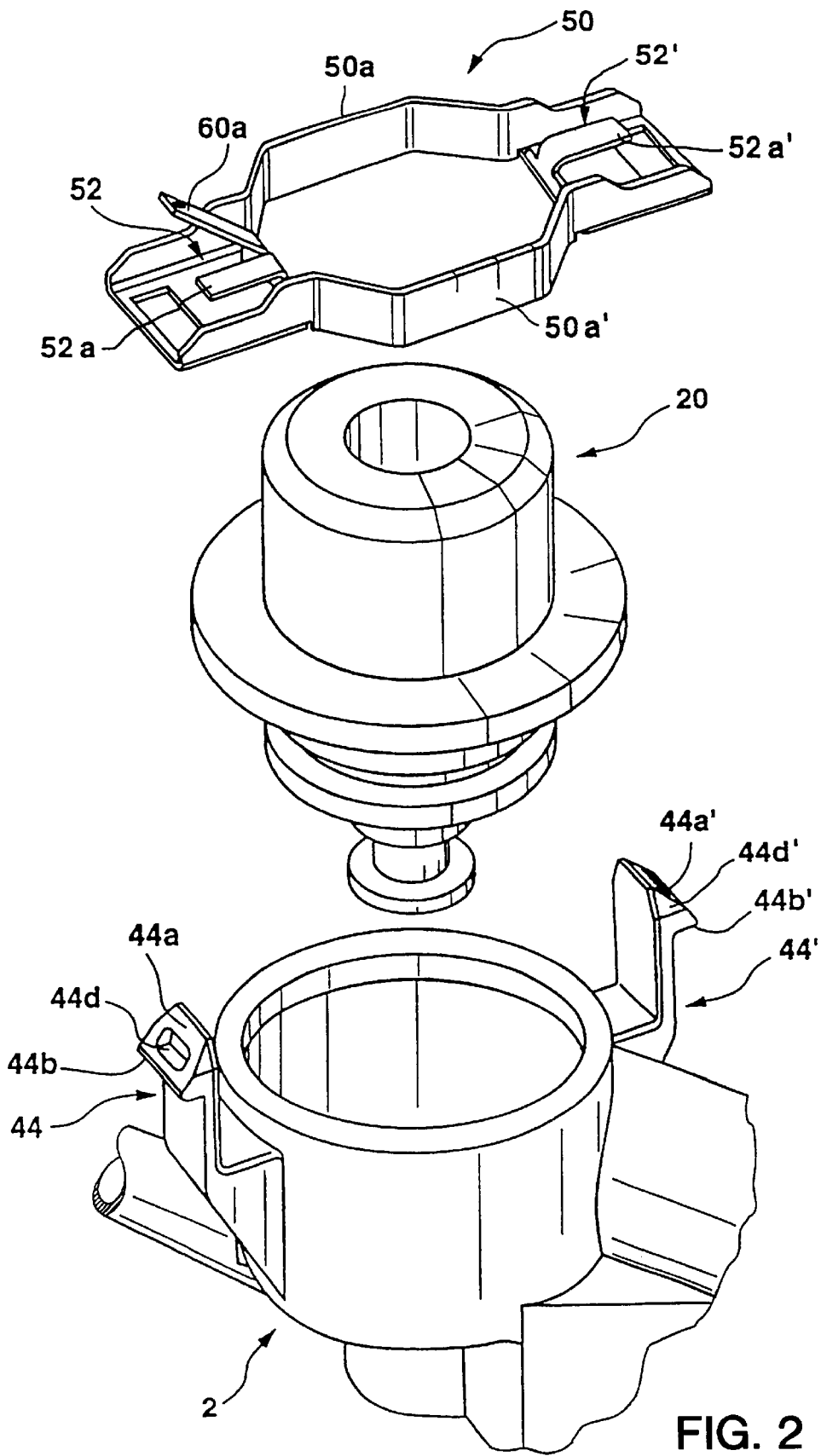
Figure 3:
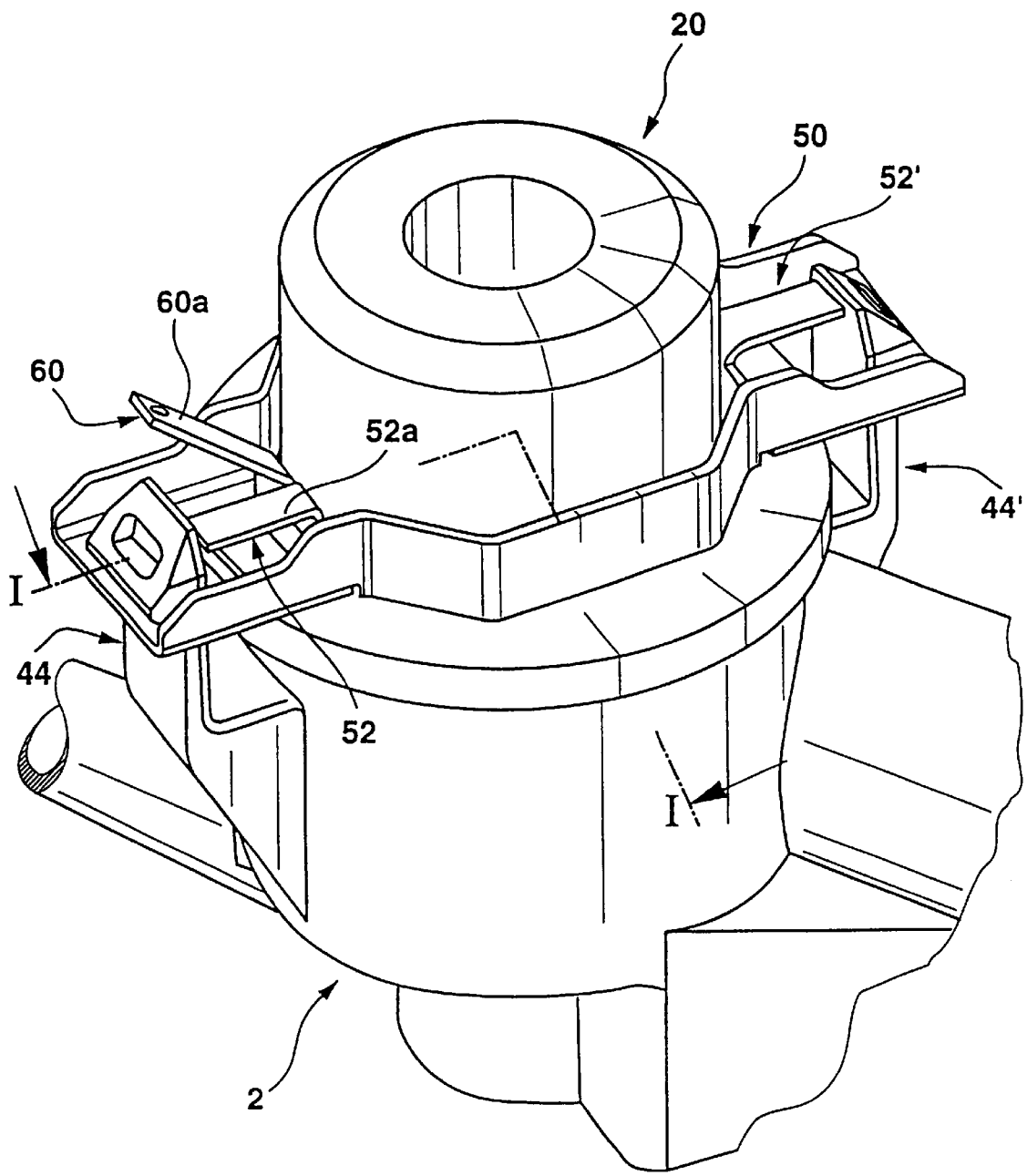

FIG. 1 shows a longitudinal section through the subassembly 20 and through a partial region of the body 2. FIG. 3 shows an oblique perspective side view in which the body 2, the subassembly 20, and the fastening element 50 that secures the subassembly 20 to the body 2 are assembled. FIG. 2 shows an oblique perspective side view of the body 2, the subassembly 20, and the fastening element 50 in a so-called exploded depiction. The intersecting plane that is shown in FIG. 1 and extends at an angle is indicated in FIG. 3 with a dot-and-dash line labeled I—I.

In all of the FIGS., parts that are the same or function in the same manner are provided with the same reference numerals. Provided that nothing to the contrary is mentioned or depicted in the drawings, that which is mentioned and depicted in conjunction with one of the Figures also applies to the other exemplary embodiments. So long as nothing to the contrary ensues from the explanations, the details of the different exemplary embodiments can be combined with one another.

In the exemplary embodiment depicted in FIGS. 1 to 3, there is a locking element 52. In the preferably selected exemplary embodiment, the locking element 52 is constituted by an elastically resilient clip 52a formed onto the fastening element 50.

A securing element 44 is provided on the body 2. Two or more securing elements can also be formed onto the body 2. In the preferably selected exemplary embodiments, two securing elements 44 and 44' are formed onto the body 2 (FIGS. 2, 3, 5, 7). The securing element 44' can be embodied identically to the securing element 44. A cutout 50d (FIG. 4) is provided on the fastening element 50, or a number of cutouts are provided. Because there are two securing elements 44, 44' on the body 2, two identically embodied cutouts 50d, 50d' on the fastening element 50 are preferable so that each of the securing elements 40, 40' can engage with a suitable location on the fastening element 50.

In addition to the locking element 52, a number of other locking elements can be provided. Since there are two securing elements 44, 44' on the body 2, two locking elements 52 and 52' are preferred on the fastening element 50. The locking element 52' is embodied identically to the locking element 52.

An arrow marked with the reference numeral 54 is drawn in FIG. 1. The arrow with the reference numeral 54 indicates the direction in which the fastening element 50 secures the subassembly 20 against the body 2. This direction will be called the securing direction 54 below.

Figure 4:
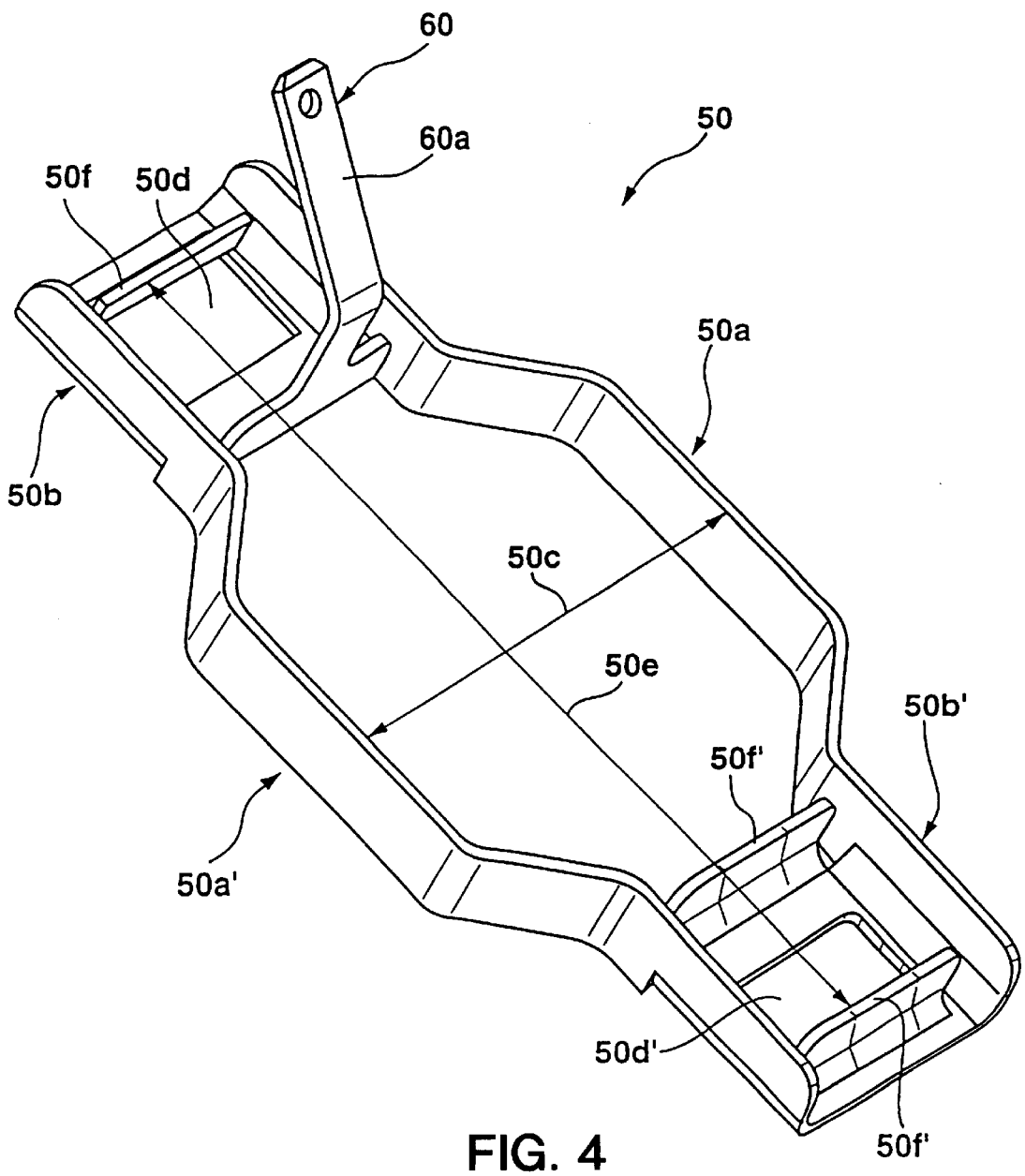

FIG. 4 shows the fastening element 50 in detail.

In comparison to the exemplary embodiment depicted in FIGS. 1 to 3, with the fastening element 50 that is selected by way of example and shown in FIG. 4, the locking element 52, 52' has been omitted. Except for the locking element 52, 52', the fastening element 50 in the exemplary embodiments depicted in FIGS. 1 to 4 is embodied essentially the same.

The fastening element 50 has a longitudinal region 50a, a longitudinal region 50a', a lateral region 50b, and a lateral region 50b'. The fastening element 50 is comprised of bent or stamped sheet metal material. At the lateral regions 50b, 50b', the transition to the longitudinal regions 50a, 50a' is angled. The fastening element 50 has an underside 50g (FIG. 1) oriented toward the bulge 38 (FIG. 1). When assembled, the underside 50g extends essentially parallel to the end face 38a of the bulge 38 or essentially lateral to the securing direction 54. Because of the angling (FIG. 4) at the transitions between the longitudinal regions 50a, 50a' and the lateral regions 50b, 50b', the side faces of the longitudinal regions 50a, 50a' extend essentially parallel to the securing direction 54 (FIG. 1). The expansion of the longitudinal regions 50a, 50a' in the securing direction 54 is essentially greater than the thickness of the longitudinal regions 50a, 50a' lateral to the securing direction 54. This achieves the fact that the lateral regions 50b, 50b' are rigidly connected to each other in a bridge-like fashion by way of the two longitudinal regions 50a, 50a' so that after the insertion of the lateral regions 50b, 50b' into the securing elements 44, 44', the fastening element 50 holds the subassembly 20 against the body 2 without any flexing to speak of. This produces a rigid connection between the subassembly 20 and the body 2 without fear of the subassembly 20 becoming detached from the body 2 due to forces acting on the subassembly 20.

There is a free space 50c between the longitudinal regions 50a, 50a' of the fastening element 50 (FIG. 4). Before assembly, the space 50c is smaller than the diameter of the outer circumference 22c (FIG. 1) of the subassembly 20. Because the longitudinal regions 50a, 50a' are quite thin transversely to the securing direction 54, the longitudinal regions 50a, 50a' are resilient to a sufficient degree transversely to the securing direction 54 so that despite the small space 50c, the fastening element 50 can be placed over the circumference 22c of the housing 22 of the subassembly 20 until the underside 50g of the fastening element 50 oriented toward the bulge 38 comes into contact with the end face 38a (FIG. 1).

In the lateral region 50b, the cutout 50d is provided with an edge 50f. Correspondingly, in the lateral region 50b', there is the cutout 50d' with an edge 50f'. The edges 50f, 50f' of the cutouts 50d, 50d' remote from each other have a distance from each other that is labeled 50e in the drawing (FIG. 4).

On its outer end, the securing element 44 has a securing head 44d. On the securing head 44d, there is an outwardly pointing bevel 44a and a securing face 44b oriented in the direction toward the body 2 (FIGS. 1, 2). Between the securing head 44d and the body 2, the securing element 44 is provided with an elastic region 44c (FIG. 1). The elastic region 44c is produced in a simple manner by virtue of the fact that an elongated post is provided between the securing head 44d and the attachment of the securing element 44 to the body 2. Since the two securing elements 44, 44' are preferably embodied identically, the securing element 44' has a securing head 44d', a bevel 44a', a securing face 44b', and likewise an elastic region.

The distance 50e between the edges 50f, 50f' is dimensioned so that when the fastening element 50 is slid on toward the body 2, the edges 50f, 50f' come into contact with the bevels 44a, 44a'. If the fastening element 50 is now pressed against the body 2, then because of the elastic regions 44c, the securing heads 44d, 44d' flex radially inward until the edges 50f, 50f reach the side of the securing faces 44b, 44b'. Then the securing heads 44d, 44d' snap radially outward in an elastically resilient manner so that the fastening element 50 is secured at the edges 50f, 50f' by the securing faces 44b, 44b' of the securing elements 44, 44'.

As long as the securing heads 44d, 44d' (FIG. 2) are deflected radially inward in an elastically resilient manner while the fastening element 50 is being slid onto the securing elements 44, 44', the clips 52a, 52a' are respectively deflected by the securing heads 44d, 44d' in an elastically resilient manner counter to the assembly direction. As soon as the securing heads 44d, 44d' spring radially outward once the sliding of the fastening element 50 onto the securing elements 44, 44' ends, the clips 52a, 52a' can also spring back into the position depicted in FIG. 1, in which the clip 52a is disposed on the side of the securing head 44d remote from the edge 50f and the clip 52a' is disposed on the side of the securing head 44d' remote from the edge 50f', so that even with the possibly occurrence of greater forces, the clips 52a and 52a' prevent the securing head 44d or 44d' from flexing in a radially inward direction. Thus the clip 52a, in cooperation with the securing element 44, constitutes the locking element 52 that prevents the fastening element 50 from being able to slip away from the securing element 44 even with the occurrence of greater forces. Correspondingly, the clip 52a' constitutes the locking element 52' that prevents the fastening element 50 from slipping away from the securing element 44'. As a result, the elastic region 44c of the securing element 44 or 44' can be embodied as relatively soft, which is why the manufacture of the securing element 44 and 44' does not require a large amount of material.

In order to reliably prevent the fastening element 50 from slipping away from the body 2 in an undesirable manner, the proposal is made to select the number of locking elements 52, 52' to be the same as the number of securing elements 44, 44' provided on the body 2.

In terms of the securing direction 54, the space between the securing face 44b and the end face shoulder 8 (FIG. 1) of the body 2 is dimensioned so that the fastening element 50 can be engaged in detent fashion on the securing elements 44, 44' without the bulge 38 of the housing 22 having to be pressed against end face shoulder 8 of the body 2. This significantly facilitates the mounting of the subassembly 20 onto the body 2. In the completely assembled state, there is a slight play s (FIG. 1) in the securing direction 54 between the bulge 38 and the fastening element 50 that is installed between the securing faces 44b, 44b' and the end face shoulder 8. Due to this play s, an electrical contact between the fastening element 50 and the housing 22 cannot be assured under all circumstances without the elastic pressing of the at least one longitudinal region 50a and/or 50a' of the fastening element 50 against the housing 22 lateral to the securing direction 54. Because the guide ring 28 and the disk 32 are preferably comprised of electrically non-conductive plastic, an electrical contact is not assured here either. Moreover, electrically non-conductive plastic is increasingly being used as a material for the body 2. This leads to the fact that the subassembly 20 is disposed in an electrically insulated fashion. As a result, an electrostatic charging of the subassembly 20 can occur, particularly if fuel is flowing through the subassembly 20 at a high flow velocity. Since normally the housing 22 is comprised of electrically conductive material, preferably metal, the electrostatic charging of the housing 22 can possibly lead to a dangerous discharging. With the fastening device proposed here, since the fastening element 50 has a good electrical contact with the housing 22 of the subassembly 20, it is easily possible to connect the subassembly 20 to a definite electrical potential by way of the fastening element 50, which prevents an electrostatic charging of the housing 22 of the subassembly 20.

The fastening element 50 in turn can easily be connected to an electrical potential, for example by soldering-on or welding-on a wire that is connected with a definite electrical potential. The definite electrical potential is, for example, the ground of a motor vehicle or a negative pole or a positive pole inside the motor vehicle.

In order to facilitate the connection of the fastening element 50 to a definite electrical potential, the proposal is made to provide a connection 60 on the fastening element 50, by means of which an electrical conductor 62 (FIG. 1), for example a strand of a cable can be easily connected. The connection 60 assures a reliable electrical connection between the conductor 62 and the fastening element 50. The electrical conductor 62 leads to a definite electrical potential. In the preferably selected exemplary embodiments, the connection 60 is embodied in the form of a flat plug contact 60a. The flat plug contact 60a is dimensioned so that a plug 62a that is frequently used in motor vehicle construction can be easily plugged together with the fastening element 50. The plug 62a is connected to the electrical conductor 62. To manufacture the flat plug contact 60a, when the fastening element 50 is stamped-out, a correspondingly stamped sheet metal region is bent outward so that it is possible to slide the plug 62a on easily.

Figure 5:
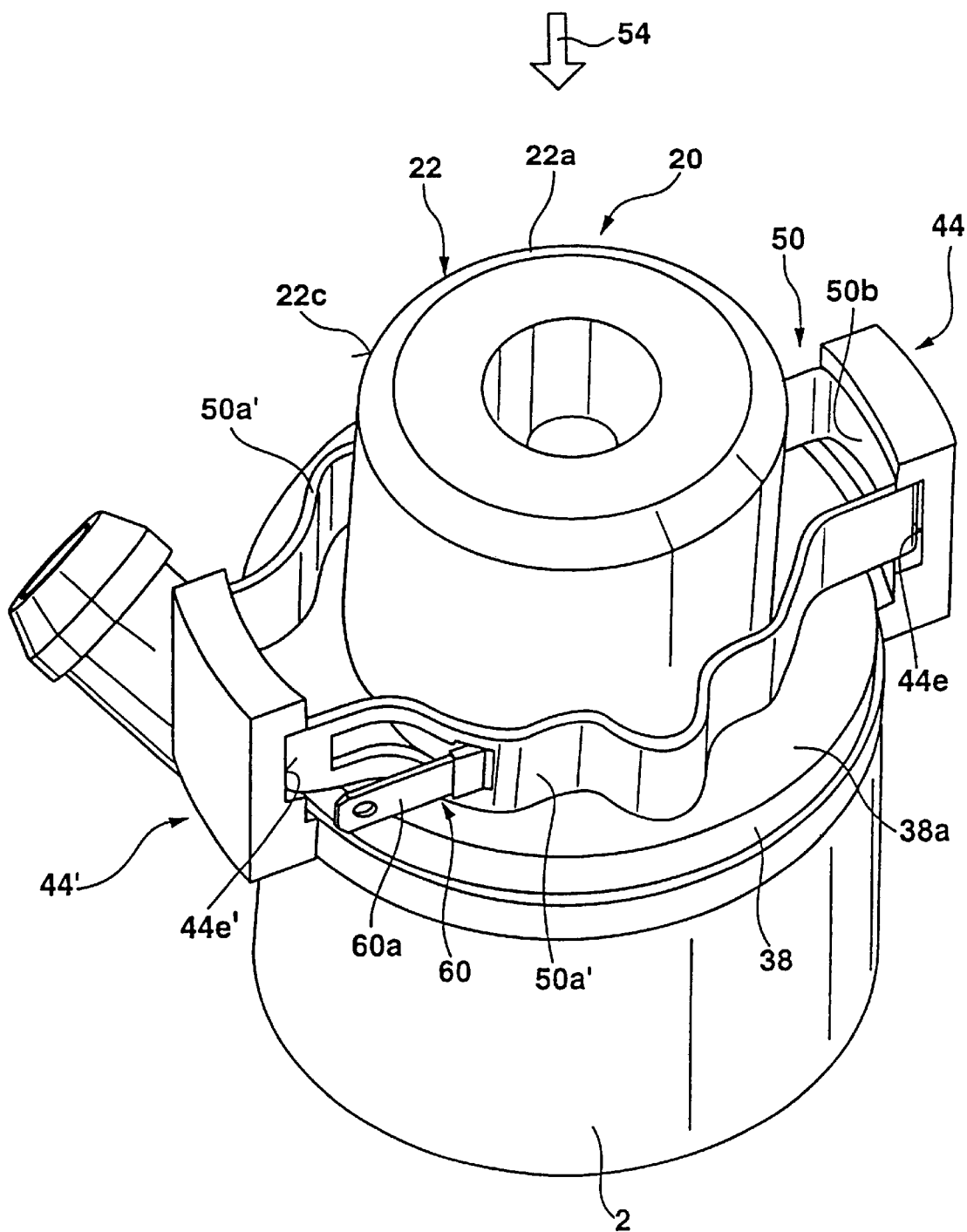

FIG. 5 shows another preferably selected, particularly advantageous exemplary embodiment.

Figure 6:
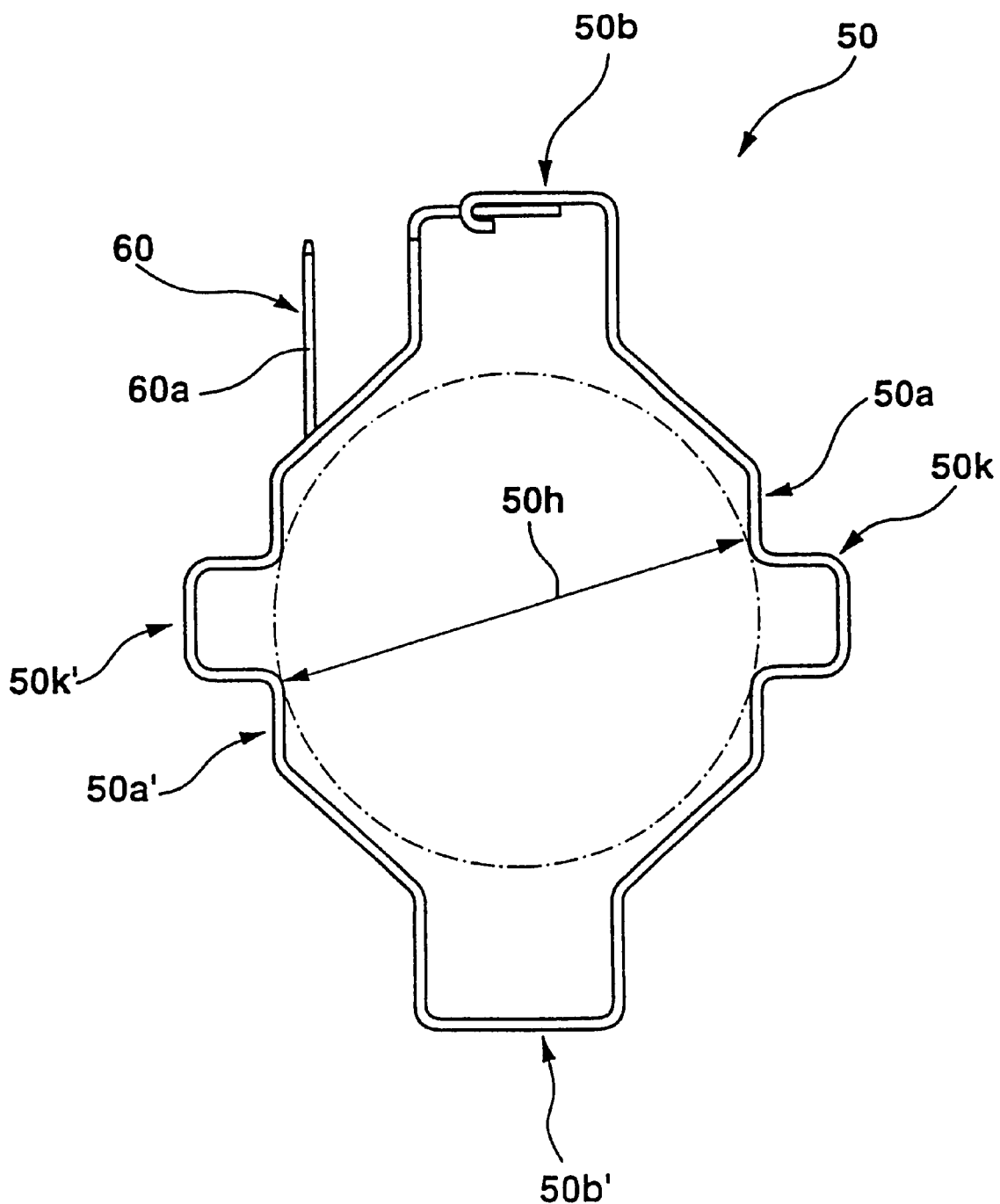

In the exemplary embodiment shown in FIG. 5, the fastening element 50 is made of a sheet metal strip whose shape is depicted in a top view in FIG. 6.

The fastening element 50 that is made of a band material is preferably shaped like the one in FIG. 6, in terms of the top view. The band material has two ends, that are connected to each other, for example in the vicinity of the lateral region 50b. The two ends of the band material can be connected, for example, in the manner that is customary with hose clamps.

Before the fastening element 50 is slid onto the housing 22 of the subassembly 20, the longitudinal regions 50a, 50a' encompass an imaginary circle with a diameter 50h. The imaginary circle with the diameter 50h is indicated with a dot-and-dash line in FIG. 6. The diameter 50h (FIG. 6) is smaller than the diameter of the circumference 22c (FIG. 5) of the housing 22. Because the diameter 50h of the imaginary circle is smaller than the diameter of the circumference 22c and because the fastening element 50 is comprised of elastically resilient material, after the fastening element 50 is slid onto the housing 22, the longitudinal regions 50a, 50a' are stretched elastically against the housing 22, lateral to the securing direction 54. Even in this exemplary embodiment, this provides for a reliable electrical contact between the housing 22 and the fastening element 50.

In the exemplary embodiment shown in FIG. 5, a radially inward pointing groove 44e is provided on the fastening element 44. Correspondingly, the securing element 44' has a groove 44e'. After the fastening element 50 is slid onto the housing 22, the lateral region 50b can be slid into the groove 44e by means of a slight rotation of the fastening element 50. The lateral region 50b' also comes into engagement with the groove 44e'. Since the fastening element 50 is dimensioned as relatively large in the securing direction 54, the fastening element 50 is quite rigid in the securing direction 54 and can consequently secure the subassembly 20 in the securing direction 54 in a favorable and rigid manner. On the other hand, since the fastening element 50 is comprised of relatively thin material lateral to the securing direction 54, the longitudinal regions 50a, 50a' lateral to the securing direction 54 are elastically resilient in a relatively favorable manner so that it is possible to easily slide the fastening element 50 onto the housing 22.

Bulges that protrude radially outward can be provided on the fastening element 50, preferably in the longitudinal regions 50a, 50a'. These bulges produce engagement points 50k, 50k' (FIG. 6) on the fastening element 50. A tool can be easily placed onto these engagement points 50k, 50k' so that it is no trouble to pull the longitudinal regions 50a, 50a' slightly apart, which permits the fastening element 50 to be easily placed onto the circumference 22c of the housing 22.

When the engagement points 50k, 50k' (FIG. 6) are pulled apart, the distance between the two lateral regions 50b, 50b' is shortened so that the fastening element 50 can be slid onto the housing part 22a of the subassembly 20 until reaching the end face 38a of the bulge 38 without the above-described rotation in the axial direction (FIG. 5). After the release of the engagement points 50k, 50k', the engagement points 50k, 50k' spring radially inward against the circumference 22c of the subassembly 20. The lateral regions 50b, 50b' of the fastening element 50 spring radially outward and consequently engage firmly in the grooves 44e, 44e' of the securing elements 44, 44'. This permits the fastening element 50 to be simply slid on without having to be rotated.

As FIGS. 5 and 6 show, the flat plug contact 60a for the connection 60 can be formed onto the fastening element 50 by being stamped-out, without this requiring an additional amount of material.

In the exemplary embodiment depicted in FIGS. 5 and 6, with the securing element 44, the elastic region 44c shown in FIG. 1 can be eliminated.

Figure 7:
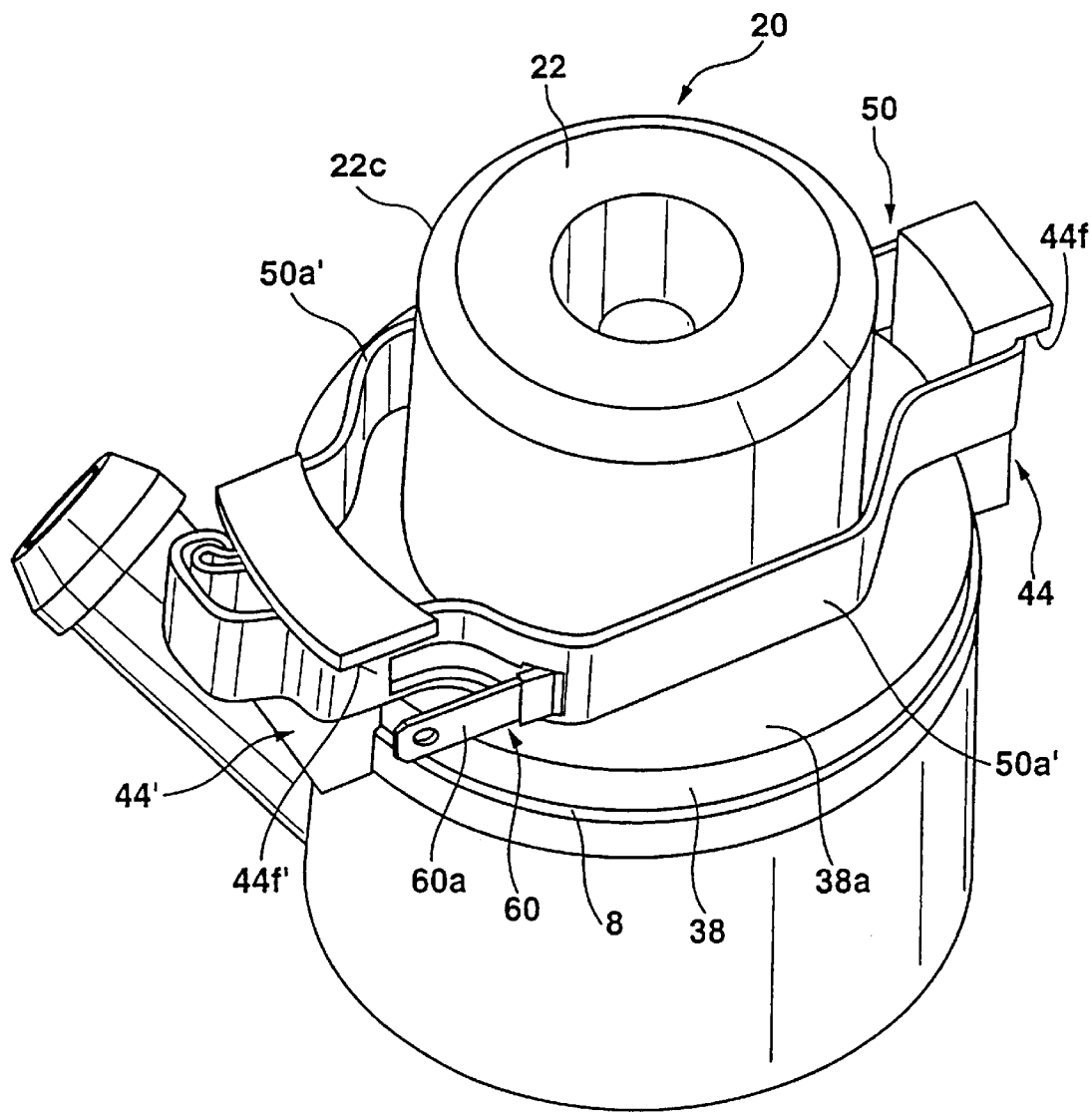

FIG. 7 shows another preferably selected, particularly advantageous exemplary embodiment.

In the exemplary embodiment shown in FIG. 7, a securing face 44f that points in the direction of the end face shoulder 8 is provided on the securing element 44. The securing element 44' has a corresponding securing face 44f'. The fastening element 50, which is comprised of flat steel, is inserted between the end face 38a of the subassembly 20 and the securing faces 44f, 44f' of the securing elements 44, 44' after the subassembly 20 is mounted onto the body 2. After the insertion of the fastening element 50, the ends of the band material are assembled in the manner that is often customary with hose clamps. As a result, it is assured that the subassembly 20 is rigidly and reliably secured to the body 2 and at the same time, a favorable electrical contact between the housing 22 and the fastening element 50 is assured due to the elasticity lateral to the securing direction 54 and due to the elastic pressing of the longitudinal region 50a and/or the longitudinal region 50a' against the housing 22 lateral to the securing direction 54.

Because of the electrical contacting of the subassembly 20 by way of the fastening element 50, a change to the subassembly 20 is advantageously not required in order to be able to connect the subassembly 20 to a definite electrical potential.

Due to the favorable elasticity of the fastening element 50 lateral to the securing direction 54, a favorable electrical contact between the subassembly 20 and the fastening element 50 is assured, even with large measurement tolerances in the subassembly 20.

In the exemplary embodiments depicted, the circumference 22c of the subassembly 20 is cylindrical. The circumference 22c can also have the shape, for example, of a truncated cone. In this instance, the direction of the elastic prestressing of the at least one elastic flex region provided in the longitudinal regions can be correspondingly adapted so that the flex region is elastically prestressed against the subassembly at an angle between for example 60° and 90° in relation to the securing direction 54.

The fastening element 50 secures the subassembly 20 on the body 2. With the fastening device proposed here, a reliable electrical connection between the subassembly 20 and the fastening element 50 is assured by way of the elastic prestressing of the at least one flex region 50a, 50a' lateral to the securing direction 54. As a result, it is possible to simply and easily connect the subassembly 20 to a definite electrical potential by way of the fastening element 50. The fastening device is particularly provided for a fuel delivery system of an internal combustion engine of a motor vehicle.

The foregoing relates to preferred exemplary embodiments of the invention, it being understood that other variants and embodiments thereof are possible within the spirit and scope of the invention, the latter being defined by the appended claims.

What is claimed is:

1. A fastening device for securing a subassembly (20) to a body (2) of a fuel delivery system, comprising a one-piece fastening element (50) that secures the subassembly (20) in relation to the body (2) in a securing direction (54), having an electrical contact means (60) and in which at least one closed flex region (50a, 50a') is provided on said fastening element (50), the closed flex region (50a, 50a') being prestressed in an elastically resilient manner against the subassembly (20, 22c) essentially transversely to the securing direction (54).

2. The fastening device according to claim 1, in which an electrical conductor (62) is connected to the electrical contact means (60).

3. The fastening device according to claim 2, in which the connection (60) is constituted by a flat plug contact (60a) formed onto the fastening element (50).

4. The fastening device according to claim 1, in which the fastening element (50) is embodied so that the fastening element is thinner in the at least one flex region (50a, 50a') transversely to the securing direction (54) than it is in the securing direction (54).

5. The fastening device according to claim 2, in which the fastening element (50) is embodied so that the fastening element is thinner in the at least one flex region (50a, 50a') transversely to the securing direction (54) than it is in the securing direction (54).

6. The fastening device according to claim 3, in which the fastening element (50) is embodied so that the fastening element is thinner in the at least one flex region (50a, 50a') transversely to the securing direction (54) than it is in the securing direction (54).

7. The fastening device according to claim 1, in which at least one securing element (44, 44') that engages behind the fastening element (50) is provided on the body (2).

8. The fastening device according to claim 2, in which at least one securing element (44, 44') that engages behind the fastening element (50) is provided on the body (2).

9. The fastening device according to claim 3, in which at least one securing element (44, 44') that engages behind the fastening element (50) is provided on the body (2).

10. The fastening device according to claim 4, in which at least one securing element (44, 44') that engages behind the fastening element (50) is provided on the body (2).

11. The fastening device according to claim 7, in which the securing element (44, 44') is elastic lateral to the securing direction (54).

12. The fastening device according to claim 7, in which at least one locking element (52, 52', 52a, 52a') is provided on the fastening element (50) and prevents the fastening element (50) from releasing the securing element (44, 44').

13. The fastening device according to claim 11, in which at least one locking element (52, 52', 52a, 52a') is provided on the fastening element (50) and prevents the fastening element (50) from releasing the securing element (44, 44').

\* \* \* \* \*